J. C. CONKEY.
Revolving-Harrow.
No. 20,195.   Patented May 11, 1858.
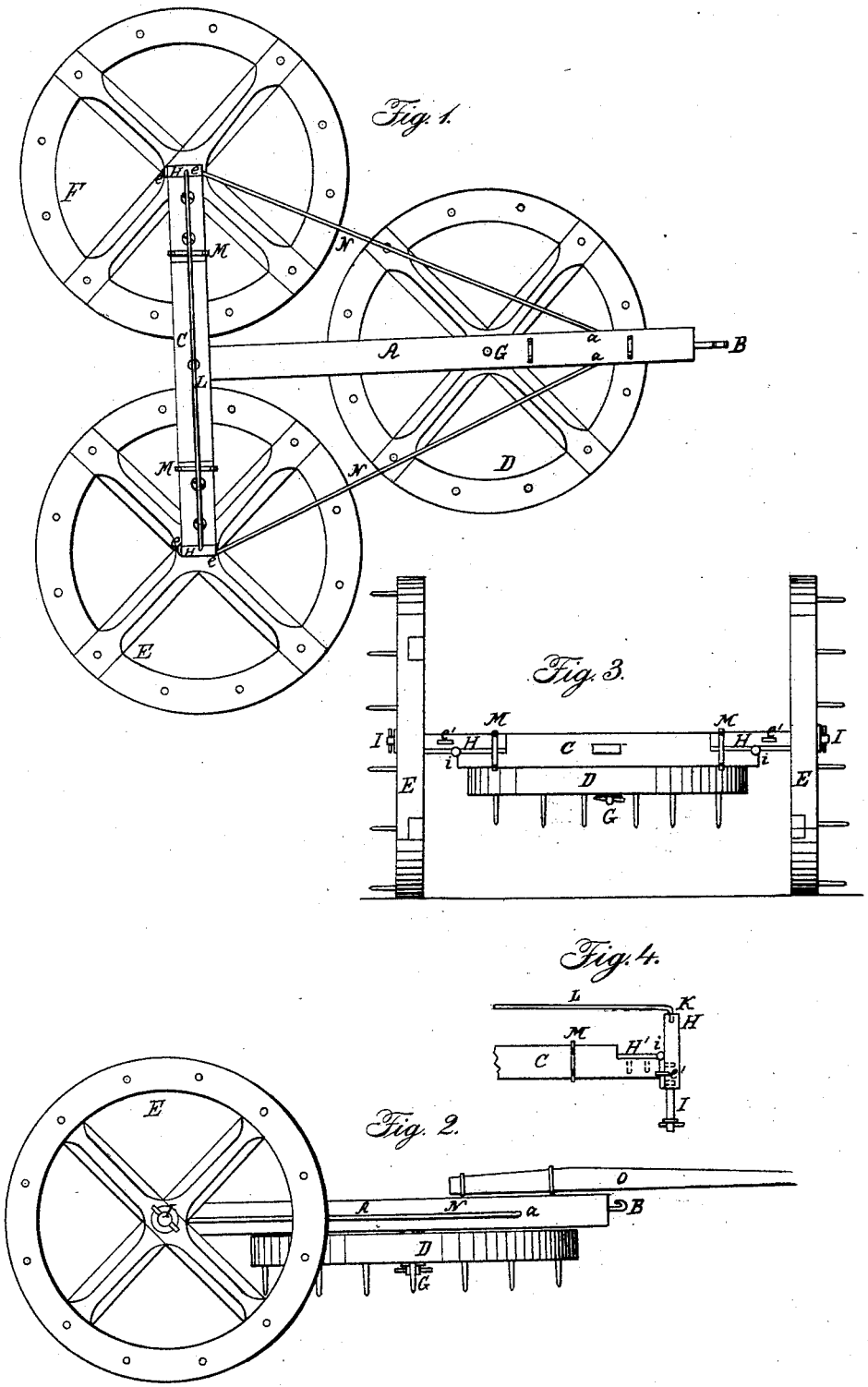

UNITED STATES PATENT OFFICE.

J. C. CONKEY, OF WASHINGTON, OHIO.

IMPROVEMENT IN HARROWS.

Specification forming part of Letters Patent No. 20,195, dated May 11, 1858.

*To all whom it may concern:*

Be it known that I, JONAS C. CONKEY, of Washington, in the county of Hancock and State of Ohio, have invented new and useful Improvements in Rotary Harrows; and I do hereby declare the following to be a full and complete description thereof, reference being had to the accompanying drawings, in which—

Figure 1 is a top view of the harrow when in a condition for work; Fig. 2, a side view of the harrow when in a condition to move from place to place; Fig. 3, an end view of Fig. 2; and Fig. 4, a view showing the manner of hinging the two back wheels to the cross-bar or axle-tree.

I am aware that rotary harrows have been constructed in various ways for the convenience of portability, thereby avoiding difficulty of loading; but the nature of this invention relates to the hinging of two wheels to the axle-tree, by means of which the harrow, as a whole, can be converted into a truck for the purpose of convenience in transporting it from place to place when not at work.

In my description like letters refer to like parts.

In Figs. 1 and 2, A represents a piece of timber which forms the forward part of the frame, and to the forward end of which is attached a hook or clevis, B, by which the harrow is drawn.

C, Figs. 1 and 3, represents the axle-tree which forms the back end of the frame. The working part of the harrow consists of two or more wheels, D E F, which may be made of wood or metal, and about three feet in diameter. The rim of these wheels is supported by arms which cross at the center and form a hub, through which is inserted the axle upon which they revolve.

The teeth of the harrow are placed in the rim of the wheels D E F. The wheel D is placed in a horizontal position beneath the bar A, and revolves upon the pin seen at G. The wheel D remains in its horizontal position both while the harrow is at work and while it is being transported from place to place. The wheels E and F are attached to the axle-tree C by hinge-joints $i\ i$, one of which is represented in Fig. 4. The upper side of the axle-tree C is cut away so as to admit the shank of the axle H, as seen at H'. The axle H may be formed of iron and the lower end, J, made round, like the axle of a carriage. The shank part H is hinged to the axle-tree C in the manner represented by a hinge-joint, and when the harrow is at work the wheels E and F will occupy the position represented in Fig. 1, the axle H I also occupying the position seen in Fig. 4. When the wheels E F are turned up upon their edges, as seen in Figs. 2 and 3, the shank H of the axle H I lies upon the bed H', the shank being held in its position by the bands M M. (Seen in Figs. 1, 3, and 4.) For the purpose of keeping the axle H I steady in a vertical position while the harrow is at work, I introduce the rod L, Fig. 1, a section of which is also shown in Fig. 4. The ends of this rod are bent at right angles and enter a hole in the end of the shank, as seen at K, Fig. 4.

In order to prevent an undue amount of strain upon the hinges $i\ i$ in consequence of the draft, I attach a rod, N N', upon each side of the draw-beam A at $a$, and from thence they extend backward and are inserted into the axle H I, close to the hub of the harrow, as seen at $e$, Figs. 1 and 4. This rod must have a swivel, or pass loosely through the axle at $e\ e'$, to prevent torsion of the rod when the wheels E F are turned from a horizontal to a vertical position. When the wheels E F are turned upon the edges, as seen in Figs. 2 and 3, for the purpose of converting the harrow into a truck, the shanks H of the axles are kept in the bed H' by bands M, Figs. 1, 3, and 4, which are slipped over the ends of the shanks, as seen in Figs. 1 and 3. A temporary neap, O, is introduced, as seen in Fig. 1, in moving from place to place.

What I claim as my invention, and desire to secure by Letters Patent, is—

The combination of the hinge $i$, axle H I, and axle-tree C, when arranged in connection with revolving harrows, as described, for the purpose set forth.

JONAS C. CONKEY.

Witnesses:
I. BRAINARD,
W. H. BURRIDGE.